(12) United States Patent
McEwen et al.

(10) Patent No.: US 8,473,001 B2
(45) Date of Patent: Jun. 25, 2013

(54) MODULAR TELECOMMUNICATIONS DEVICE

(75) Inventors: Colin McEwen, Newbury (GB); Robert Banks, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 431 days.

(21) Appl. No.: 12/802,746

(22) Filed: Jun. 11, 2010

(65) Prior Publication Data

US 2010/0317294 A1 Dec. 16, 2010

(30) Foreign Application Priority Data

Jun. 12, 2009 (GB) .................................. 0910148.6

(51) Int. Cl.
*H04M 1/00* (2006.01)

(52) U.S. Cl.
USPC .................. 455/552.1; 455/553.1; 455/556.1; 455/557; 455/575.1; 455/90.3; 455/418; 455/419; 370/464; 379/93.05; 379/93.09

(58) Field of Classification Search
USPC ................ 455/552.1, 553.1, 556.1, 557, 558, 455/66.1, 418, 419, 90.3, 575.1; 370/464; 379/93.05, 93.09
See application file for complete search history.

(56) References Cited

U.S. PATENT DOCUMENTS

| | | | | |
|---|---|---|---|---|
| 5,809,115 | A * | 9/1998 | Inkinen | 379/93.05 |
| 6,243,578 | B1 * | 6/2001 | Koike | 455/557 |
| 6,516,202 | B1 * | 2/2003 | Hawkins et al. | 455/556.2 |
| 6,690,947 | B1 * | 2/2004 | Tom | 455/556.1 |
| 7,194,285 | B2 * | 3/2007 | Tom | 455/556.1 |
| 8,180,395 | B2 * | 5/2012 | Moran et al. | 455/556.1 |
| 2004/0233930 | A1 * | 11/2004 | Colby, Jr. | 370/464 |
| 2005/0014526 | A1 | 1/2005 | Pan | |
| 2007/0004450 | A1 * | 1/2007 | Parikh | 455/556.1 |
| 2008/0198018 | A1 | 8/2008 | Hartley | |

FOREIGN PATENT DOCUMENTS

| | | |
|---|---|---|
| EP | 1 420 570 A1 | 5/2004 |
| GB | 2 362 071 A | 11/2001 |
| WO | WO 03/007584 A1 | 1/2003 |
| WO | WO 2007/052896 A1 | 5/2007 |
| WO | WO 2008/099384 A2 | 8/2008 |

* cited by examiner

*Primary Examiner* — April G Gonzales (74) *Attorney, Agent, or Firm* — Muirhead and Saturnelli, LLC (57) ABSTRACT

A communication device is disclosed which includes a wireless communicator part for use with a cellular telecommunications network and a supplementary part to which the wireless communicator part is coupleable. The wireless communicator part has an associated identifier for uniquely identifying it to the network. The supplementary part also has an associated identifier for uniquely identifying it to the network. The identifiers enable the network to determine the functional attributes of the part with which the identifier is associated. Embodiments are described which allow the network to always be aware of the functional attributes of the device. The functional attributes of the device will change depending upon the coupling and uncoupling of the wireless communicator part to the supplementary part. The identifiers may be IMEIs and may be transmitted as a USSD string.

31 Claims, 5 Drawing Sheets

MODULAR TELECOMMUNICATIONS DEVICE

TECHNICAL FIELD

This application relates to modular telecommunications devices and to a method of operating such devices in a telecommunications network.

BACKGROUND OF THE INVENTION

WO-A-2008/099384 (Modu Limited), which is incorporated herein by reference, discloses a modular cellular/mobile telecommunications device. The device comprises a small, basic wireless communicator device with a minimalist interface—a small screen, a few keys, a speaker, a microphone etc. The wireless communicator device can be used on its own to communicate via a cellular/mobile telecommunications network. However, the device is intended to be used in conjunction with "a jacket" or "host" device into which the wireless communicator is inserted and with which it is docked or "pouched".

WO-A-2008/099384 discloses an arrangement for automated consumer electronic appliance reporting. The appliance is one type of jacket into which the wireless communicator is inserted. The jacket is said to have a distinct identification code. In paragraph [00489] it is said that the jacket identification code may be reported to a "recipient". This recipient is an external server coupled to the telecommunications network via the internet (see paragraph [00461]). The electronic appliance may be an entertainment device, such as a home entertainment centre, television or a communication device such as a telephone.

Using such a modular telecommunications device in a cellular/mobile telecommunications network presents particular challenges, and it would be desirable to address these challenges.

SUMMARY OF THE INVENTION

According to one aspect of the system described herein, a communication device is provided for use with a telecommunications network including a wireless communicator part and a supplementary part to which the wireless communicator part is coupleable, characterised in that the supplementary part has an associated identifier for uniquely identifying it to the network, the identifier enabling the network to determine the functional attributes of the supplementary part.

In the embodiment the wireless communicator part is a device smaller than a typical mobile telephone handset which has only basic functionality, such as a relatively small, low resolution display and a simple keypad. The supplementary part in the embodiment is a jacket having a slot into which the wireless communicator part is inserted, which causes functional coupling of the wireless communicator part and the supplementary part. However, other coupling arrangements are also within the scope of the system described herein. The jacket in the embodiments provides an enhancement to the functions already provided by the wireless communicator part, supersedes those functions or provides additional functions. For example, the supplementary part may include a larger, higher resolution display which is used instead of the smaller display of the wireless communicator part. The supplementary part may include additional functions, such as a camera. By providing the network with the unique identifier of the supplementary part, the network is able to determine the functional attributes of this part with reference to a database or look-up table which associates the unique identifier with particular functional attributes. This is in contrast to WO-A-2008/099384 which does not disclose any mechanism for reporting to the network the functional attributes of the jacket. The network is therefore unable to tailor its interactions with the device (combined wireless communicator part and supplementary part/jacket) in accordance with different/additional functionality provided by the supplementary part/jacket.

The wireless communicator part may have an associated identifier for uniquely identifying it to the network, this identifier enabling the network to determine the functional attributes of the wireless communicator part. In the embodiments, if both the wireless communicator part and the supplementary part are provided with a unique identifier, this allows the functional attributes of each of those parts to be determined by the network and hence the functional attributes of the communicator part and supplementary part pair.

At least one of the identifiers may comprise an IMEI. In the preferred embodiment, both the unique identifiers comprise respective IMEIs.

When a conventional unitary (one part) mobile device registers with a telecommunications network, the IMEI of that device is transmitted to the network. According to an embodiment of the system described herein, the device (combined wireless communicator part and supplementary part/jacket) is operable to transmit to the network the identifier for uniquely identifying the supplementary part in response to the coupling or decoupling of the supplementary part to the wireless communicator. Preferably, the network identifier is transmitted automatically in response to this coupling/decoupling (assuming that the jacket power is on). The transmission of the identifier is performed at any time in response to the coupling/decoupling (assuming that the jacket power is on). This allows the network to be updated as to different functional attributes provided via the device due to the coupling/decoupling which may occur over a period of time whilst the wireless communicator part is registered with the network. It is advantageous to transmit the identifier on coupling and on decoupling of the supplementary part (in real time) so that the addition or removal of functional attributes of the supplementary part are indicated to the network as these change at the device.

In the case of a CDMA communicator in a GSM jacket, the registration/deregistration of jacket may occur at jacket power on/off.

The supplementary part identifier may be transmitted by the wireless communicator or by the supplementary part itself.

The identifier may be transmitted as a USSD string. In one embodiment the USSD string includes a special portion (an "escape" command) for indicating to the network that identifier data is contained in the USSD string for allowing the network to identify and extract the identifier data.

The supplementary part may comprise a car kit, and may include functions to provide enhanced performance, such as the capability to couple by Bluetooth or other wireless connection to the wireless communicator part, and include features such as echo cancelling and eCall functionality.

The unique identifier of the supplementary part may be useable by the network to determine whether the supplementary part is permitted for use with the network. For example, if the supplementary part is stolen or cloned, this could be notified to the network. When a supplementary part with the relevant unique identifier then attempts to be used with the network, the network can prevent such use on receipt of the unique identifier.

The supplementary part may include a Subscriber Identity Module (SIM). The wireless communicator may also include a SIM. The network is advantageously operable to allow both SIMs to be registered (used) simultaneously on either the same network or on two different networks. The SIMs may be registered to the same or different user accounts.

The device may be configured such that coupling and decoupling of the wireless communicator part to the supplementary part automatically causes the power management of the wireless communicator part to be adjusted. For example, parts of the wireless communicator part that become redundant when it is coupled to the supplementary part may be deactivated (typically this would be the display and the keyboard). This is particularly advantageous as the wireless communicator part is typically a small device and will therefore only have limited space within its case to accommodate a battery. The battery will therefore have limited battery life.

When coupled, the jacket power supply may charge the communicator power supply. This is particularly advantageous if the jacket is a car kit, for example.

Advantageously, the communication device is provided with a dielectric component for improving the performance of radio antennae of the wireless communicator part when the wireless communicator part is coupled to the supplementary part. The dielectric component may be a planar component of rectangular or trapezoidal configuration that is positioned to overlap the active parts of the antenna. The dielectric component may be provided within the casing of the wireless communicator part or may be provided in the casing of the supplementary part but positioned such that it overlaps the antenna of the wireless communicator part when the wireless communicator part is coupled to the supplementary part.

The telecommunications network may be of a first radio access technology type such as GSM or UMTS, and the wireless communication part may be of a second, different radio access technology type such as CDMA. The supplementary part is advantageously operable to enable the device to communicate with the telecommunications network. In an embodiment communication with the telecommunications network is possible because the supplementary part includes an identifier and/or SIM and/or radio functionality compatible with the first radio access technology.

BRIEF DESCRIPTION OF THE DRAWINGS

For a better understanding of the system described herein, embodiments will now be described with reference to the accompanying drawings in which.

In the drawings like elements are generally designated with the same reference number.

DETAILED DESCRIPTION OF VARIOUS EMBODIMENTS

Figure 1:
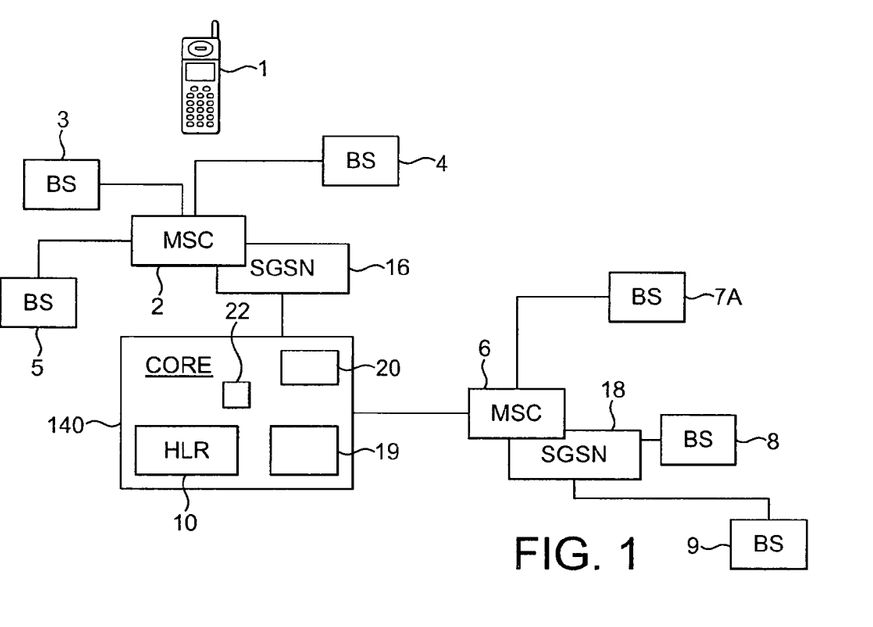
FIG. 1 is a diagrammatic drawing of certain elements of a mobile telecommunications network.

A very general description of certain elements of a mobile/cellular telecommunications network will now follow, with reference being made to FIG. 1. FIG. 1 is not intended to show in detail the elements of any one particular type of network but is provided to illustrate general principles of such networks.

Mobile/cellular networks comprise a plurality of base stations. Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone.

In a GSM mobile telecommunications network, each base station comprises a base transceiver station (BTS) and is connected to a base station controller (BSC) (not shown in FIG. 1). A BSC may control more than one BTS. The BSC is subsequently connected to the Mobile Switching Centre (MSC) The BTSs and BSCs comprise the radio access network.

In a UMTS mobile telecommunications network, each base station comprises a node B and is connected to a radio network controller (RNC). An RNC may control more than one node B. The node B's and RNC's comprise the radio access network.

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7A, 8 and 9. In practice, the network will incorporate many more MSCs and base stations than shown in FIG. 1. The base stations 3, 4, 5, 7A, 8 and 9 each have dedicated connection to their MSC 2 or MSC 6—typically a cable connection.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6.

In GSM, UMTS and LTE networks (and some other network types), each subscriber to the network is provided with a smart card or SIM which, when associated with the user's mobile terminal identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated SIM card) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 140 and extracts the corresponding subscriber MSISDN and other subscriber data from the appropriate storage location. In this way, therefore the particular subscriber is effectively registered with a particular MSC (MSC 2).

When the subscriber using mobile terminal 1 wishes to make a call, they enter the telephone number of the called party in the usual manner. This information is received by the base station 3 and passed on to MSC 2. MSC 2 routes the call towards the called party.

The functionality just described may also apply to the proposed LTE mobile telecommunications network, with its eNode Bs performing the functionality of the base stations and the MME/UPE performing the functionality of the MSCs. It is also to be appreciated that the functionality just described is one example of a network in which the embodiments of the system described herein may be implemented.

Further shown in FIG. 1 is a database 19, an Equipment Identity Register (EIR) database 20, and a receiving entity 30 that may be used in connection with the system described herein, as further discussed elsewhere herein.

Figure 2:
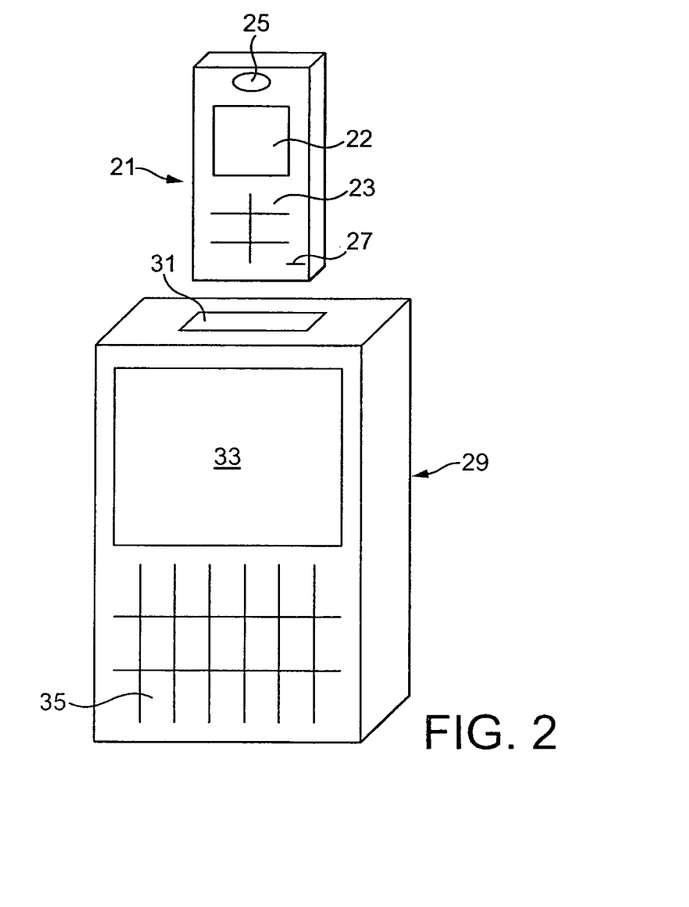
FIG. 2 shows a perspective view of a basic wireless communicator device and a jacket therefore.

FIG. 2 shows an arrangement comprising a basic mobile telecommunications device that comprises a wireless communication device 21 with a small display screen 22, a small number of, perhaps six, keys 23, a speaker 25 and a microphone 27. The wireless communicator 21 is small relative to a conventional unitary (one piece), non-modular cellular telecommunications terminal and can be coupled to a jacket 29 by inserting the wireless communicator 21 into an appropriately sized slot opening 31 in the jacket 29. When the wireless communicator 21 is fully inserted in the opening 31, electrical and functional connection between the wireless communicator 21 and the jacket 29 occurs which allows the user of the wireless communicator 21 to take advantage of features provided by the jacket 29, such as an improved display 33, an improved key pad 35. The jacket 29 may include different or additional features, such as a camera, or car kit.

The coupling together of the wireless communicator 21 and the jacket 29 may be performed by respective female and male connectors which provide both mechanical coupling and electrical/functional coupling. Alternatively, the coupling may be performed wirelessly using Bluetooth or other wireless technology to enable functional coupling between the wireless communicator 21 and the jacket 29. This wireless coupling may be activated by the automatic detection of the proximity of the wireless communicator 21 to the jacket 29.

The embodiments now to be described address challenges that occur in the implementation of the above-noted type of device in a mobile/cellular telecommunications network.

A wireless communicator may be provided with an International Mobile Equipment Identity (IMEI). An IMEI is a fifteen digit number that is allocated to a mobile terminal (or other) hardware, to uniquely identify that terminal. The IMEI is burnt into the one-time programmable memory of the terminal.

According to the GSM/3GPP standards, the format of the IMEI is:

MMMMMMMM.NNNNNN.C

Where MMMMMMMM is an 8-digit model manufacturer reference number (model ID), NNNNNN is the individual serial number within the model ID, and C is a check digit. If a manufacturer makes more than 1 million units of a particular model, they need to apply for a second or subsequent model ID.

Conventionally a mobile terminal is allocated a particular model ID. The functionality provided by this model is stored in the database 19 where it is associated with the model ID. For example, for a particular model ID, the database would store the display resolution and its radio functionality (such as whether the device is 3G capable, and information about other functions provided by the particular model of mobile terminal). When a mobile terminal registers with the network the IMEI of the mobile terminal is transmitted from the terminal to the network. The network then, in the conventional manner, uses the IMEI to determine the model functionality by consulting the database 19 by extracting the model ID from the IMEI. This allows the network to determine what functions the mobile terminal can support. Other parts of the registration sequence determine whether a particular feature is enabled, such as whether a 3G capable mobile terminal is locked down to 2G by menu selection.

The functionality of the mobile terminal is then stored in the HLR 10 of the mobile telecommunications network. When an incoming call for the mobile terminal is received by the network, the HLR 10 is interrogated and the functionality of the mobile terminal is determined. This allows the network to identify at call set-up time whether the call can be completed correctly. For example, if the mobile terminal is a data-only terminal and the incoming call is a voice call, this will be identified by information in the HLR 10. The network then generates signalling messages to report that the call cannot be completed and provides an indication of the reason why.

According to a feature of a first embodiment of the system described herein, in addition to the wireless communicator 21 being provided with an IMEI as described above, the jacket 29 is also provided with an IMEI (different from the IMEI of the wireless communicator 21).

In accordance with the embodiment, the network database 19 includes the model ID of the jacket 29, together with the functionality provided by the jacket 29. Therefore, when the IMEI of the jacket 29 is provided to the network, the functionality of the jacket 29 can be determined by the network by extracting the model ID of the jacket 29 from the IMEI and consulting the database. This functionality data can be used, for example, by the HLR to determine whether an incoming call can be completed correctly.

In accordance with the embodiment, when the wireless communicator 21 registers with the network (without an associated jacket), the IMEI is signalled to the network and used by the network in the conventional way. When the wireless communicator 21 is inserted into and coupled to the jacket 29, the IMEI of the jacket 29 is also transmitted to the network.

Although this embodiment refers to the jacket 29 having an IMEI and this being used to identify the functionality of the jacket 29, it should be understood that other identifiers, and methods of signalling the identifiers to the network, and other types of database, may be used to identify and establish the functionality of a jacket.

As an alternative to signalling the IMEI, which allows the network to obtain device functionality data from a database, the jacket could send data which explicitly indicates its functionality to the network. However, by providing this information in the database 19 and using the IMEI to look up this data, the amount of signalling between the jacket and the network is reduced, particularly if a wireless communicator is docked repeatedly with the same or different jackets. It also allows stolen jackets to be identified and refused use as will be discussed in more detail below.

By providing the jacket 29 with an IMEI (or other identifier that provides an indication of the jacket's functionality), this allows the network to be informed of the different (usually enhanced) functionality provided by the jacket 29. If this functionality is not signalled to the network, then the network will not be aware of the functionality and the advantages provided by the functionality may not be available to the user. By way of example, the display 22 of the wireless communicator 21 will typically have a relatively low resolution. The network will be aware of this due to signalling of the IMEI from the wireless communicator 21 when the wireless communicator is registered with the network. According to the embodiment, when the wireless communicator 21 is inserted into and coupled to the jacket 29, the jacket IMEI (or other identifier) is provided to the network and enables the network to determine that different or enhanced functionality is available, such as a high resolution display 33. When generating images for display by the jacket 29, the network can tailor the images sent to take advantage of the high resolution screen 33 of the jacket 29. The IMEI of the wireless communicator 21 and the IMEI of the jacket 29 are used together to give the network a true reflection of the combined features and capabilities of the end user device, comprising the wireless communicator 21 and the jacket 29 in combination.

WO-A-2008/099384 discloses one example in which a CDMA wireless communication is coupled to a GSM jacket—see paragraph [0097]. Even if the jacket were provided with a GSM SIM, it would not be possible for the jacket to register with the GSM network according to the arrangement disclosed. Although the CDMA wireless communicator disclosed may include an Electronic Serial Number (ESN), this is not compatible with a GSM network. According to an important feature of the present embodiment, a GSM jacket may be modified to include an IMEI. An IMEI is required to register with a GSM network, and therefore the modified jacket allows a CDMA wireless communicator coupled to a GSM jacket to be properly registered with a GSM network.

Some car kits require an IMEI to register correctly with a network. By providing the jacket with an IMEI, this allows the wireless communicator/jacket concept to be extended to car kits, with the car kit being implemented as a jacket to which the wireless communicator is attached.

As part of the EU eSafety initiative, it is expected that all new cars at some time in the future will be fitted with an "eCall" terminal that will establish an emergency voice call to a Public Safety Answering Point (PSAP) when the car is involved in an accident. The voice call will be automatically set up on detection of an accident—typically, by activation of one or more of the car's air bags. An eCall device could be implemented as a jacket to which the wireless communicator is attached, and such an eCall jacket would be provided with an IMEI.

For consistent appearance to the network, according to the embodiment, if a jacket has a SIM, then it is preferably also provided with an IMEI. However, even if the jacket does not contain a SIM, providing such a jacket with an IMEI may still be advantageous—for example, to identify stolen or counterfeit jackets, discussed further below.

Some networks require that 3G devices have a USIM (UMTS SIM), and use the IMEI to identify 3G capability. If the jacket SIM is not a USIM but the wireless communicator is 3G, then selection of the jacket SIM and subsequent registration with the network should cause the combination to be marked as a 2G device within the HLR or other network databases, even if the jacket supports some 3G capabilities The problem of mobile device theft and subsequent illegal use is something that the mobile industry has spent much time and effort to reduce to a minimal level. This embodiment seeks to advantageously reduce the theft and subsequent illegal use of jackets. According to the embodiment the jacket is provided with an IMEI. A stolen jacket can be uniquely identified by its IMEI. When a jacket is stolen, the IMEI is reported to the network, and the network is then able to prevent such a jacket being used with the network in a similar manner to which a conventional mobile terminal that is identified as stolen is prevented from being used with the network. The IMEI of a jacket can be recorded on the Equipment Identity Register (EIR) database 20 within the network. Such a network database holds records of three types of device, namely "black", "grey" and "white" devices. When a device requests service from the network its IMEI is provided and is checked against the EIR. The category of device is determined by looking up the IMEI in the EIR. "Black" devices are those reported stolen or whose operation on the network will adversely affect network operation. These devices are not allowed to access the network. "Grey" devices are classed as non-conforming but may be used on the network "White" devices are those that conform to the requirements set down by the network operator and are allowed to be used on the network.

By providing the jacket with an IMEI, this can also reduce or prevent cloning of jackets and the use of counterfeit jackets.

In addition, the known SIM lock feature (whereby a device only works if a SIM from the correct network operator is inserted) could be used to protect jacket subsidy and/or service. The jacket includes software which checks that the SIM has the correct home network identification and will not allow the jacket to register if incorrect. In the embodiment the jacket subsidy can be protected by arranging for the jacket software to check that the jacket SIM is from the correct operator before completing the start-up process.

An alternative SIM lock feature may be used to protect jacket subsidy and/or service. That is, the network will include a database of which devices (as identified by their unique IMEI) can be used with which SIMs. In accordance with this embodiment, the SIM of the jacket is associated in the database with the IMEI of the jacket. The core network only allows a jacket to be used on the network when the jacket, as identified by the IMEI transmitted to the network core is used with the appropriate SIM (details of which are also sent to the network core). The matching of the IMEI to the SIM is performed by consulting the SIM lock database.

A second embodiment, now to be described, describes a mechanism for delivering the IMEI or other identifier to the network. The Standards define a mechanism for transmitting the IMEI from a mobile terminal to the network. However, according to the Standards, the IMEI is conventionally only read from a terminal and transmitted to the network on terminal start-up/registration with the network. The need to transmit the IMEI after start-up/registration is not contemplated in the Standards. However, when a communications device comprises a wireless communicator 21 and a jacket 29, each with a different IMEI/functionality, that can be coupled to and decoupled from one another whilst the wireless communicator 21 and/or jacket 29 remains registered with the network, this mechanism of transmitting the IMEI only at start-up/registration is unsatisfactory.

Unstructured Supplementary Service Data (USSD) is a mechanism that enables data to be transmitted between a mobile device and the network at any time (not just at registration), and generally no charge is made for this service. Various USSD definitions are described in Standards documents GSM 03.90 and ETSI TS 100 549.

The conventional USSD message set is of the form:

| Set Up | **USSD* <parameter 1> * <parameter 2> * ...<last parameter> # SEND |
| Activate | *USSD # SEND |
| Deactivate | # USSD # SEND |
| Delete | ## USSD # SEND |
| Check status | *# USSD # SEND |

Two examples of conventional USSD messages are:
To set VoiceMail delay-before-divert to 30 seconds, the following USSD is used:

**61* [voicemailbox number in international format OR network shortcode]*11*[delay in seconds, 30 max] # SEND To obtain a pre-pay balance for those networks which do not use a network shortcode, the USSD is *#10# SEND.

Two options for providing the network with up-to-date functionality data for a particular jacket, when this is docked to the wireless communicator are:
1. To provide each jacket feature/capability with a respective USSD code (e.g. a particular code for each display resolution), or
2. To provide one new USSD code that indicates to the network that data relating to all functions/capabilities will follow (which may be an explicit indication of the function or the IMEI, or other identifier, of a device, which is then used to obtain functionality information from database 19).

According to 2, a new USSD code may be assigned that indicates that the functionality indication follows. In this embodiment this USSD command is referred to as "escape". This escape USSD command indicates that the subsequent part of the sequence is not part of a conventional USSD command. The escape USSD command instructs the network to pass the USSD command to the receiving entity 30. The receiving entity 30 extracts the functionality indication data from the USSD command and provides it to appropriate other network entities, such as the HLR 10. In this way the HLR 10 or other network entity is provided with the functionality indication so that it can interact with the jacket 29 in the appropriate way (for example to format images sent with the appropriate resolution of the display 33 of the jacket 29).

The functionality indicator may be an explicit indicator of functions provided by the jacket 29. With this arrangement, the actual screen resolution of the display 33 of the jacket 29 will be included after the escape USSD command. However, this arrangement is not preferred as it will require a significant amount of data to be transmitted each time a jacket 29 is coupled to or decoupled from a wireless communicator 21, particularly if there are several functions provided by the jacket 29 which need to be instructed to the network.

In an arrangement the functionality indication is the IMEI of the jacket 29 or another unique identifier of the jacket 29. The IMEI/unique identifier is used by the receiving entity 30 to look up what functionality corresponds to that IMEI/unique identifier in the database 19.

According to the arrangement where the IMEI of the jacket 29 is sent, on docking a wireless communicator to the jacket 29 for the first time, the following sequence would be sent:
 [Set-up]**Escape*Modular*Add-
   Jacket*Jacket_IMEI#SEND
where
 "Escape" is the special sequence defined above,
 Modular is the text string "Modular",
 Add_Jacket could be either a proprietary numeric code or the text string—note that the use of Escape means that the proprietary numeric code will not conflict with existing USSD parameters, and
 Jacket_IMEI   is   in   the   conventional   form MMMMMMMM.NNNNNN.C as above When the wireless communicator is undocked from the jacket 29, the shorter de-activate sequence can be used
 [De-Activate]#Escape*Modular*Add-Jacket#SEND, or
 [Activate]*Escape*Modular*Remove-Jacket#SEND Option 1. above is not preferred because this requires a multiplicity of new USSD codes to be defined, one USSD code for each functionality to be indicated.

In arrangements described in WO-A-2008/099384 the wireless communicator can be considered to be a "master" device. It is the wireless communicator whose IMEI will be transmitted to the network. The jacket can be considered to be a "slave" (it does not have an IMEI and it does not transmit IMEI data to the network). According to a feature of the present embodiments, either the wireless communicator or the jacket may be the master. Both the wireless communicator and the jacket have an IMEI. Both IMEI's are transmitted to the network. The master device is the device that transmits at least one IMEI to the network and may also transmit the slave device's IMEI to the network. For example, when the wireless communicator is a CDMA device and the jacket is a GSM jacket, the jacket must be the master device and the CDMA wireless communicator the slave device in order to allow proper registration with the GSM network using the IMEI of the GSM jacket. That is, the wireless communicator is not capable of allowing registration with the network because it is a CDMA wireless device which cannot itself communicate with the GSM network and it does not have a SIM.

WO 2008/099384 refers to the possibility of the jacket having a SIM and the wireless communicator having a SIM. However, how this would work is not described in detail.

It is known for mobile telecommunication subscribers to have "multi-SIM" accounts, where a subscriber is provided with two SIMs that are used in different devices, such as a built-in car phone and in a hand-held device. Also, mobile terminals capable of receiving/accommodating two SIMs are known. A "dual SIM" arrangement is known from the Standards.

According to an embodiment of the system described herein, the wireless communicator 21 and the jacket 29 are each provided with a respective SIM. This presents challenges if the respective SIMs have different settings, properties and/or are for different networks (that is, the SIMs are provided by different network operators/legal entities). In such a situation service conflicts can be created. For example, the SIM in the wireless communicator 1 may not be configured for MMS and would therefore not have an MMS subscription. If the SIM in the jacket 29 had an MMS subscription, this would cause a conflict. A conflict may also arise if the SIM toolkit (STK) in one of the SIMs attempts to set or hide menus in conflict with the other SIM. To overcome this difficulty dual slot protocols may be provided.

A dual slot protocol provides a pre-defined feature of resolving priorities and potential conflicts. Typically, one slot is defined as the master slot and the other the slave, although it is also possible to define Slot 1 and Slot 2 together with a means of selecting which slot is the master.

By default, device properties (e.g. selectable menus) are defined by the master SIM, and when the other SIM is selected then its device definitions are re-loaded into the device(s) concerned. Outgoing calls are made using the master SIM, and if incoming calls conflict then the call from the master SIM is given priority. However other possibilities exist as can be seen by those skilled in the art.

It should be appreciated that the user may have more than two SIMs. If the user has multiple jackets for use with their wireless communicator 21, then each of those jackets may be provided with a respective SIM. The dual slot protocols may be extended to apply to multiple SIMs.

According to the embodiment, the user's account with the network allows the user to have multiple SIMs associated with the account. A plurality of these SIMs may be registered and active on the network simultaneously.

There may be a master-slave relationship between the SIMs. For example, the SIM in the wireless communicator 21 may be the master SIM and the SIM or SIMs in the user's jacket or jackets may be slave SIMs. Services provided by the SIM or SIMs and the jacket or jackets are associated with the master SIM so that they are billed in a single bill to the user. Such a bill may include references to the slave SIM used to provide the service.

A jacket and the associated SIM may be usable by more than one user. For example, the user may allow a member of its family to use a jacket and associated SIM capable of transmitting MMS messages coupling to that family member's wireless communicator. The network with which the SIM of the family member's wireless communicator is registered allows use of the jacket and arranges for the family member to be billed for services obtained by the MMS jacket. The SIM of the MMS jacket may have the same or a different home network to the SIM of the family member's wireless communicator.

Another embodiment of the present system described herein is directed to power management. When the wireless communicator 21 is docked to the jacket 29, some functionality of the wireless communicator 21 is overtaken by, or rendered superfluous by, the jacket 29. For example, the display 22 of the wireless communicator 21 will be invisible when the wireless communicator 21 is inserted in the slot 31 of the jacket 29, and the display 33 of the jacket 29 takes over the function of displaying data for both the jacket 29 and the wireless communicator 21.

It is particularly important to minimise the use of power by the wireless communicator 21 because, by virtue of its relatively small size, it is equipped with only a small and relatively low capacity battery. In accordance with this embodiment, rather than leaving the display 22 of the wireless communicator 21 functioning when it is obscured by the jacket 29, the display 22 is automatically switched off when the wireless communicator 21 is coupled to the jacket 29. The display 22 may be automatically re-energised when the mobile communicator 21 is removed from the jacket 29.

Automatic power-down or "deep sleep" may be performed when the wireless communicator 21 is coupled to the jacket 29 so that all functions not required (due to jacket command) or not current (due to call state or idle mode) are switched off (or into deep sleep). These powered down or sleeping functions are automatically re-started when the wireless communicator 21 is removed from the jacket 29.

In accordance with another embodiment of the system described herein, the jacket 29 is coupled to a vehicle to provide car kit telephony functionality to the wireless communicator 21 when this is coupled to the jacket 29. This coupling may be performed wirelessly by Bluetooth (or other wireless communication mechanism between the wireless communicator 21 and the jacket 29). Additionally, the coupling of the wireless communicator 21 to the jacket 29 may automatically implement a SIM access profile which senses the use of a car kit, senses the car ignition status and mutes the car audio system. An echo canceller may also be implemented by the jacket 29 or the wireless communicator 21. Antenna coupling to an antenna mounted on the car body may also be provided. The coupling of the wireless communicator 21 to the jacket 29 may also activate eCall systems in the jacket 29.

In an alternative arrangement eCall could be implemented in the wireless communicator 21. This may be advantageous as there are likely to be fewer wireless communicators 21 than jackets (because a user may have multiple jackets for use in different situations). The wireless communicator 21 may be configured to detect the air pressure wave generated when a car air bag is deployed, in the manner described in our co-pending U.K. patent application No. 0812647.6. As described in that patent application, through the use of an electro-acoustic transducer, it is possible to detect a pressure wave of at least a predetermined intensity, such as one that may occur upon the activation of a vehicle's air bag. As the electro-acoustic transducer has a diaphragm that can be displaced under the influence of a pressure wave, the transducer can therefore be monitored for an event occurrence indicative of the pressure wave. This monitoring may involve passively monitoring at least one electrical connection of the transducer for an electrical signal of at least a predetermined level, such that the electrical signal is the event indicative of the pressure wave. Alternatively, or in addition, the monitoring may involve passively monitoring a pressure switch, such that activation of the pressure switch is the event indicative of the pressure wave. Upon detection of the pressure wave event, a trigger signal may be output to an emergency notification device to instigate a communication regarding a possible emergency situation. The transducer used in the patent application is the ear piece (loudspeaker) of a mobile device. The arrangement of that patent application may be further adapted so that the wireless communicator 21 is capable of detecting deployment of the air bag by the air pressure wave generated even when the mobile communicator 21 is coupled to the jacket 29. The ear piece 25 of the wireless communicator 21 is obscured by the jacket 29, so that the air pressure pulse received in the ear piece 25 will be reduced when the wireless communicator 21 is coupled to the jacket 29. Wireless communicator 21, on detecting coupling to the jacket 29, can automatically adjust the threshold at which the air bag is deemed to be deployed (to a lower air pressure wave threshold) received by the ear piece.

A further embodiment of the system described herein relates to improving the antenna performance of the wireless communicator 21 when this is coupled to the jacket 29.

Figure 3:
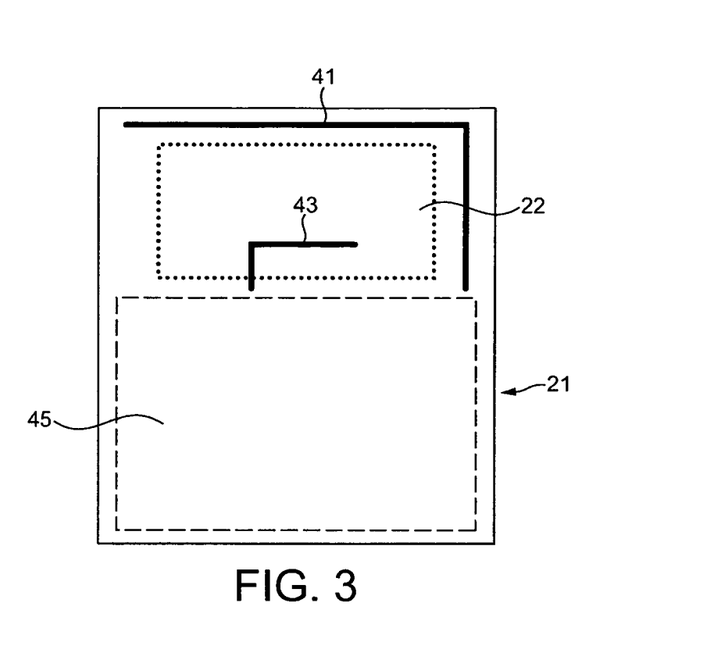
FIG. 3 shows a rear cross-sectional elevation view of a wireless communicator having an antenna arrangement.

The wireless communicator 21 may include an antenna arrangement as shown in FIG. 3, where the wireless communicator 21 includes a low band antenna 41 and a high band antenna 43. The antennae 41,43 are positioned behind the display 22 and above the active electronics area 45. The antennae 41,43 are internal (i.e. inside the case of the wireless communicator 21). The wireless communicator 21 may be docked into jackets comprising appliances such as cameras, home or kitchen appliances and the like. Such appliances are often metallic and comprise a sheet steel casing. These casings will provide a high degree of RF shielding, leading to very poor radio performance of the antennae 41,43, when the wireless communicator 21 is docked.

Figure 4:
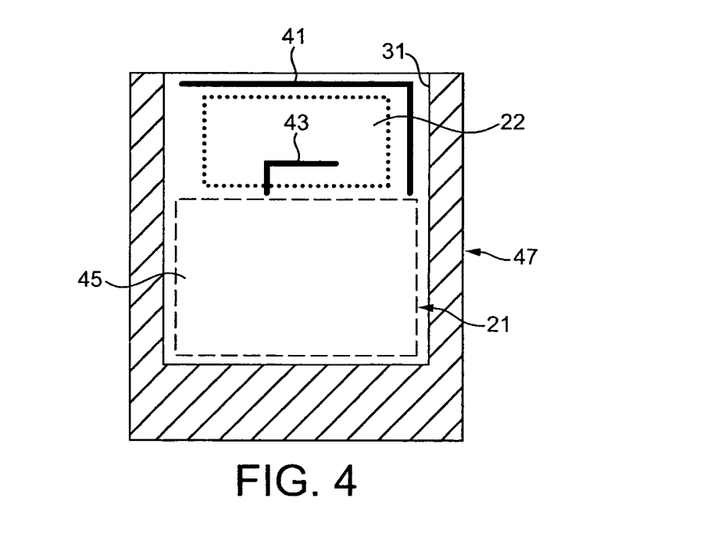
FIG. 4 shows the wireless communicator of FIG. 3 docked into a jacket or appliance.

FIG. 4 shows the wireless communicator 21 of FIG. 3 docked into an appliance 47.

According to an embodiment of the system described herein, the radio performance of the antennae 41,43 of the wireless communicator 21 of the embodiment is improved by the provision of dielectric components. In addition, the dielectric components can be used to control the level of cellular RF applied to the jacket appliance 47 to prevent interference during location area updates.

Figure 5:
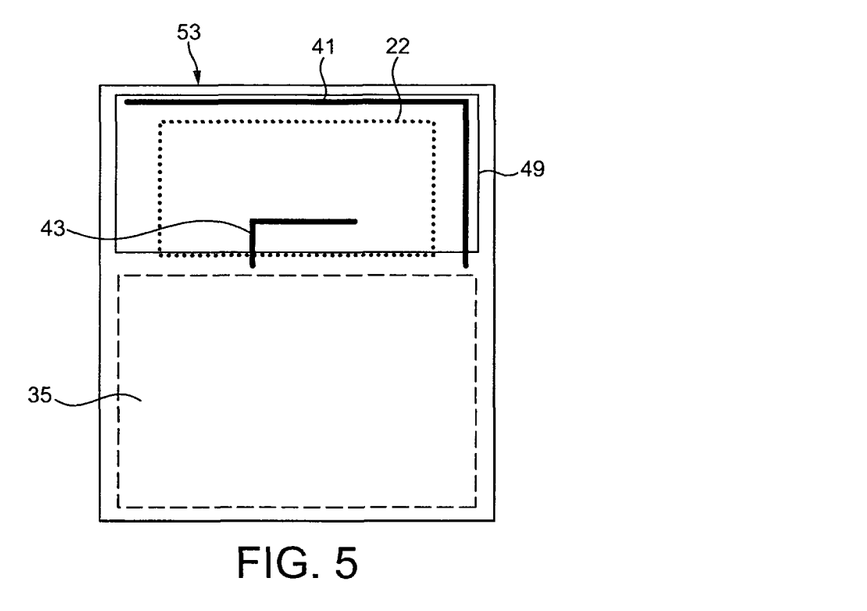
FIG. 5 shows a rear cross-sectional elevation view of a wireless communicator according to an embodiment of the system described herein in which a dielectric part is provided.
Figure 6:
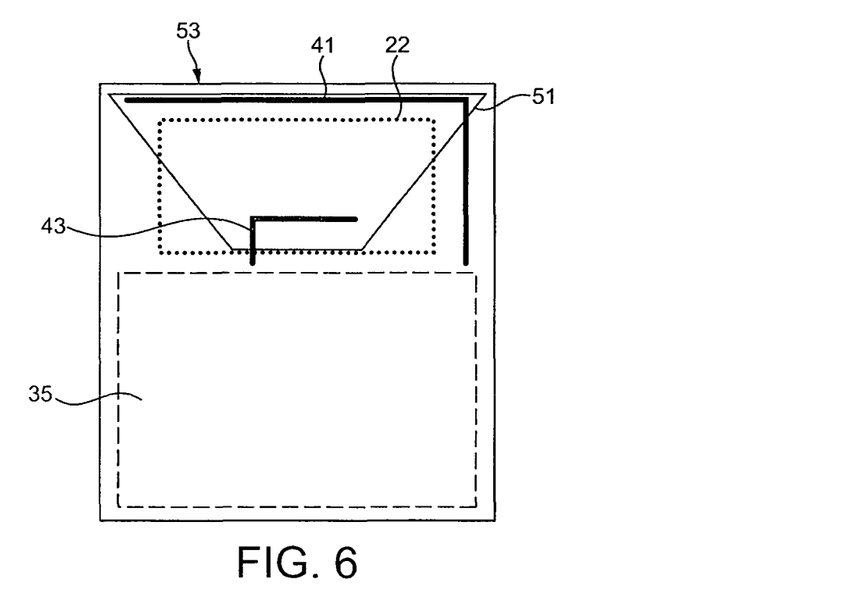
FIG. 6 shows a view corresponding to FIG. 5 but with a different configuration of the dielectric component.
Figure 7:
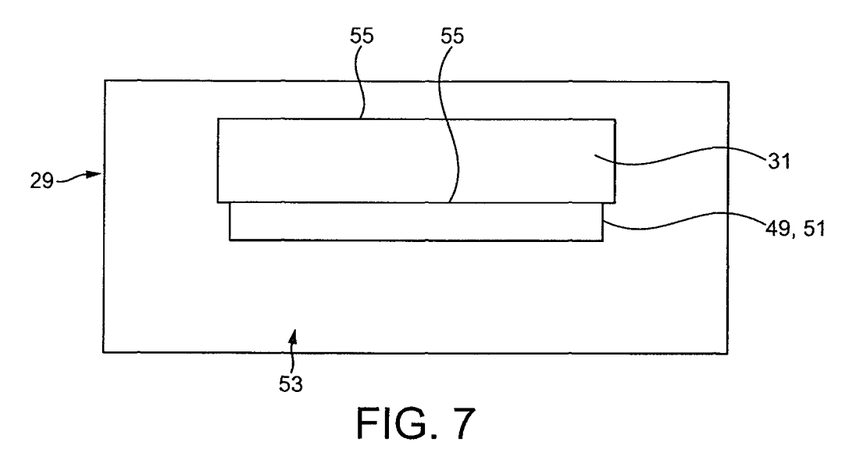
FIG. 7 shows an overhead view of the jacket according to the FIG. 5 or 6 embodiment of the system described herein.
Figure 8:
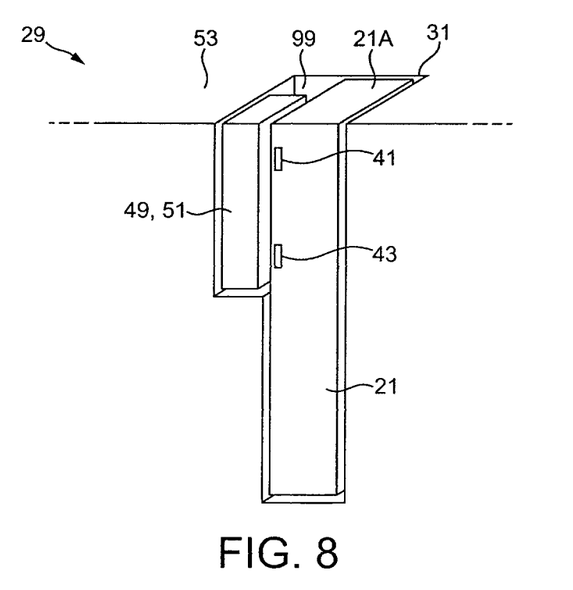
FIG. 8 is a cut-away perspective view of the wireless communicator and jacket of FIGS. 5, 6 and 7.

The dielectric component may comprise a planar rectangular component 49 as shown in FIG. 5, positioned within the slot 31 of the appliance 47 casing to overlap the active parts of the low band antenna 41 and the high band antenna 43 (the planar rectangular dielectric component 49 may not overlap the feed points of the antennae 41,43 where they are connected to the active electronics area 45) of the communicator 21. Alternatively, as shown in FIG. 6, the dielectric component 51 may be of planar trapezoidal configuration with the dielectric component 51 tapering towards the active part of the high band antenna 43. Such a configuration of dielectric component 51 is appropriate because the low band antenna 41 has a larger active part than the high band antenna 43. The dielectric component 51 is arranged such that it couples the active parts of both the low band antenna 41 and the high band antenna 43 to the slot antenna 53 formed by the top surface of the communicator 21 when it is docked into the appliance 47. This coupling is created by the dielectric slab 49,51 acting as a waveguide FIG. 7 shows an overhead view of the FIG. 5 or 6 embodiment. The slot antenna 53 is formed by the planar metallic sheet of the top surface of the appliance 47, and comprises the slot 31. The slot 31 is rectangular and is a half wavelength long (this wavelength being selected according to the wavelengths at which the appliance 47 operates with the cellular network). Feedpoints 55 are in the middle of each of the longest sides of the rectangular slot 31. The slot 31 of the appliance 47 is lined on one side with the dielectric slab 49,51 that is positioned to be in alignment with the low band antenna 41 and high band antenna 43 when the wireless communicator 21 is docked therein. When the wireless communicator 21 is coupled to the appliance 47 and positioned within the slot 31, the antennae 41,43 will be sandwiched between the screen 22 of the wireless communicator 21 and the dielectric component 49,51 of the slot 31. As shown in FIG. 8, a radiating aperture 99 is formed by the gap between the edge of the slot 31 in the metallic casing of the appliance 29 and the top surface 21A of the communicator 21. This gap is fully or partially filled by the dielectric component 49 or 51.

The dielectric constant of the components 49, 51 can be determined by applying standard waveguide dimensioning rules to ensure that the cut-off frequency of the guide is sufficiently low to support the low-band and high-band signals from the wireless communicator.

The communication device may be enhanced according to another embodiment by providing Near Field Communication (NFC) capability.

A problem arises if the wireless communicator 21 is provided with NFC capability as the jacket 29 may shield the NFC elements when the wireless communicator 21 is coupled thereto. This shielding of the NFC elements may be overcome by use of a dielectric component as described in relation to the previous embodiment. The jacket 29 may be provided with NFC capability. Dual slot protocols may be used to manage the co-existence of NFC in the wireless communicator 21 and the jacket 29. The wireless communicator 21 and the jacket 29 may have different NFC accounts for the purpose of making payments and the like by NFC. NFC functionality may be implemented in the jacket 29 with or without a SIM/USIM in the jacket. There are two versions of NFC, one which is handset based and one which is SIM based. The embodiment is applicable to both versions of NFC.

The wireless communicator 21 that is not NFC capable may be made NFC capable by coupling it to an NFC enabled jacket 29 (with appropriate SIM functionality if necessary).

A particular SIM capability and associated mobile terminal support may be required to support NFC. To enable the wireless communicator and jacket 29 combination to support NFC both the SIMs specific capability and the device support functionality are incorporated into the NFC jacket 29.

In the embodiments the wireless communicator 21 includes the minimum components of functionality to make and receive a telephone call and to send and receive SMS messages. The wireless communicator 21 has a radio transmitter and receiver. The jacket 29 may additionally include some of this functionality but does not necessarily include it.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A communication device for use with a telecommunications network, comprising:
   a wireless communicator part, wherein the wireless communicator part has an associated identifier for uniquely identifying the wireless communicator part to the network, the wireless communicator part identifier enabling the network to determine functional attributes of the wireless communicator part; and
   a supplementary part to which the wireless communicator part is coupleable, wherein the supplementary part has an associated identifier for uniquely identifying the supplementary part to the network, the supplementary part identifier enabling the network to determine functional attributes of the supplementary part, wherein the :Functional attributes of the supplementary, part are different from the functional attributes of the wireless communicator part, wherein the wireless communicator part identifier is transmitted to the telecommunications network after registration of the wireless communicator part with the network, and wherein the supplementary part identifier is transmitted to the network independently of transmission of the wireless communication part identifier and in response to the supplementary part being coupled to or decoupled from the wireless communicator part.

2. The device of claim 1, wherein at least one of the supplementary part identifier or the wireless communicator part identifier comprises an IMEI.

3. The device of claim 1, wherein the wireless communicator is operable to transmit the supplementary part identifier.

4. The device of claim 1, wherein the supplementary part is operable to transmit the supplementary part identifier.

5. The device of claim 1, wherein the device is operable to transmit the supplementary part identifier as a USSD string.

6. The device of claim 5, wherein the USSD string includes a special portion for indicating to the network that identifier data is contained in the string for allowing the network to identify and extract the supplementary part identifier.

7. The device of claim 1, wherein the supplementary part is a car kit or eCall device.

8. The device of claim 1, wherein the supplementary part identifier is usable by the network to determine whether the supplementary part is permitted for use with the network.

9. The device of claim 1, wherein the supplementary part includes a verifier that the supplementary part is permitted by the network to be used therewith.

10. The device of claim 1, wherein the supplementary part includes a SIM.

11. The device of claim 10, wherein the wireless communicator includes a SIM, the network being operable to allow both SIMs to be registered and in use with one or more networks simultaneously, and with one or more user accounts.

12. The device of claim 1, further comprising:
a power manager that automatically adjusts the power management of the wireless communicator part in response to coupling and/or decoupling of the wireless communicator part to the supplementary part and arranged to deactivate or reduce the power consumption of elements of the wireless communicator part that are not used when the wireless communicator is coupled to the supplementary part.

13. The device of clan 1, wherein the wireless communicator part includes a radio antenna for communicating with the network, and including a dielectric component for improving the radio performance of the antenna when the wireless communicator part is coupled to the supplementary part.

14. The device of claim 1, wherein said telecommunications network is of a first radio access technology type and said wireless communicator part is of a second, different radio access technology type, and wherein the supplementary part is operable to enable the device to communicate; with said telecommunications network.

15. The device of claim 14, wherein the first radio access technology type is GSM or UMTS or any other SIM-based technology and the second radio access technology type is CDMA or Digital AMPS or any other non-SIM based technology.

16. A method of operating a communication device in a telecommunications network, wherein the communication device has a wireless communicator part and a supplementary part to which the wireless communicator part is coupleable, the method comprising;
providing the supplementary part with an associated identifier that uniquely identifies the supplementary part to the network, the supplementary part identifier enabling the network to determine functional attributes of the supplementary part; and
providing the wireless communicator part with an associated identifier which uniquely identifies the wireless communicator part to the network, the wireless communicator part identifier enabling the network to determine functional attributes of the wireless communicator part, wherein the functional attributes of the supplementary part are different from the functional attributes of the wireless communicator part, wherein the wireless communicator part identifier is transmitted to the telecommunications network after registration of the wireless communicator part with the network; and
transmitting to the network the supplementary part identifier independently of transmission of the wireless communication part identifier and in response to coupling or decoupling of the supplementary part to the wireless communicator.

17. The method of claim 16, wherein at least one of the supplementary part identifier or the wireless communicator part identifier comprises an IMEI.

18. The method of claim 16, wherein the wireless communicator transmits the supplementary part identifier.

19. The method of claim 16, wherein the supplementary part transmits the supplementary part identifier.

20. The method of claim 16, further comprising:
transmitting the supplementary part identifier as a USSD string.

21. The method of claim 20, wherein the USSD string includes a special portion for indicating to the network that identifier data is contained in the string for allowing the network to identify and extract the supplementary part identifier.

22. The method of claim 16, wherein the supplementary part is a car kit or eCall device.

23. The method of claim 16, wherein the supplementary part identifier is used by the network to determine Whether the supplementary part is permitted for use with the network.

24. The method of claim 16, wherein the supplementary part verifies that it is permitted to be used with the network.

25. The method of claim 16, wherein the supplementary part includes a SIM.

26. The method of claim 25, wherein the wireless communicator also includes a SIM, the network allowing both SIMs to be registered and in use with one or more networks simultaneously, and with one or more user accounts.

27. The method of claim 16, further comprising:
automatically adjusting the power management of the wireless communicator part in response to coupling and/or decoupling the wireless communicator part to the supplementary part and arranged to deactivate or reduce the power consumption of elements of the wireless communicator part that are not used when the wireless communicator is coupled to the supplementary part 28. The method of claim 16, wherein the wireless communicator part includes a radio antenna for communicating with the network, and wherein the communication device is provided with a dielectric component for improving the radio performance of the antenna when the wireless communicator part is coupled to the supplementary part.

29. The method of claim 16, wherein said telecommunications network is of a first radio access technology type and said wireless communicator part is of a second, different radio access technology type, and wherein the supplementary part enables the device to communicate with said telecommunications network.

30. The method of claim 29, wherein the first radio access technology type is GSM or UMTS or any other SIM-based technology and the second radio access technology type is CDMA or Digital AMPS or any other non-SIM based technology.

31. A non-transitory computer readable medium storing computer software for operating a communication device in a telecommunications network, wherein the communication device has a wireless communicator part and a supplementary part to which the wireless communicator part is coupleable, the computer software comprising:

executable code that provides the supplementary part with an associated identifier that uniquely identifies the supplementary part to the network, the supplementary part identifier enabling the network to determine functional attributes of the supplementary part;

executable code that provides the wireless communicator part with an associated identifier which uniquely identifies the wireless communicator part to the network, the wireless communicator part identifier enabling the network to determine functional attributes of the wireless communicator part, wherein the functional attributes of the supplementary part are different from the functional attributes of the wireless communicator part, wherein the wireless communicator part identifier is transmitted to the telecommunications network after registration of the wireless communicator part with the network; and     executable code that transmits to the network the supplementary part identifier independently of transmission of the wireless communication part identifier and in response to coupling or decoupling of the supplementary part to the wireless communicator.

\* \* \* \* \*